US008316085B2

(12) United States Patent
Jeon et al.

(10) Patent No.: US 8,316,085 B2
(45) Date of Patent: Nov. 20, 2012

(54) CONTENTS DELIVERY SYSTEM AND METHOD USING OBJECT REDIRECTION, AND GSLB SWITCH THEREOF

(75) Inventors: Jae Sic Jeon, Seoul (KR); Kyong Hwan Kim, Seoul (KR)

(73) Assignee: SK Planet Co., Ltd., Seoul (KR)

( * ) Notice: Subject to any disclaimer, the term of this patent is extended or adjusted under 35 U.S.C. 154(b) by 244 days.

(21) Appl. No.: 12/540,212

(22) Filed: Aug. 12, 2009

(65) Prior Publication Data

US 2010/0042681 A1 Feb. 18, 2010

Related U.S. Application Data

(60) Provisional application No. 61/088,541, filed on Aug. 13, 2008.

(51) Int. Cl.
*G06F 15/16* (2006.01)
(52) U.S. Cl. ........................ 709/203; 709/223
(58) Field of Classification Search .................. 709/203, 709/223
See application file for complete search history.

(56) References Cited

U.S. PATENT DOCUMENTS

| | | | | |
|---|---|---|---|---|
| 6,108,703 A * | 8/2000 | Leighton et al. | ............. | 709/226 |
| 6,357,010 B1 * | 3/2002 | Viets et al. | .................. | 726/4 |
| 6,484,204 B1 * | 11/2002 | Rabinovich | ................. | 709/226 |
| 6,799,214 B1 * | 9/2004 | Li | ............................. | 709/226 |
| 7,082,476 B1 * | 7/2006 | Cohen et al. | ................. | 709/246 |
| 7,103,651 B2 * | 9/2006 | Bohannon et al. | ............ | 709/223 |
| 7,216,154 B1 * | 5/2007 | Chow et al. | .................. | 709/219 |
| 7,454,500 B1 * | 11/2008 | Hsu et al. | ..................... | 709/226 |
| 2001/0049732 A1 * | 12/2001 | Raciborski et al. | .......... | 709/224 |
| 2002/0026511 A1 * | 2/2002 | Garcia-Luna-Aceves et al. | ................. | 709/226 |
| 2002/0065899 A1 * | 5/2002 | Smith et al. | .................. | 709/214 |
| 2002/0112036 A1 * | 8/2002 | Bohannon et al. | ............ | 709/220 |
| 2002/0184334 A1 * | 12/2002 | Cherry et al. | ................. | 709/217 |
| 2006/0020684 A1 * | 1/2006 | Mukherjee et al. | ........... | 709/219 |
| 2006/0288119 A1 * | 12/2006 | Kim et al. | ..................... | 709/238 |
| 2007/0005689 A1 * | 1/2007 | Leighton et al. | ............. | 709/203 |
| 2008/0163064 A1 * | 7/2008 | Swildens et al. | .............. | 715/736 |
| 2008/0208961 A1 * | 8/2008 | Kim et al. | ..................... | 709/203 |

* cited by examiner

*Primary Examiner* — David Lazaro
*Assistant Examiner* — Waseem Ashraf
(74) *Attorney, Agent, or Firm* — Lowe Hauptman Ham & Berner, LLP

(57) ABSTRACT

A contents delivery system and method using object redirection, and a GSLB switch thereof are provided. When a client requests a web server to provide a page embedded object, the web server embeds the URL representing the position of the object in an HTTP 302 redirection message and transmits the HTTP 302 redirection message including the URL to the client. A GSLB switch corresponding to the URL transmits the IP address of a specific host server selected from at least one host server storing the object to the client. Accordingly, load of the web server decreases and flexibility in change of a CDN solution is secured.

8 Claims, 4 Drawing Sheets

FIG 3

| Host server information | Stored object information | IP address | Data traffic information | Fail-over information |
|---|---|---|---|---|
| 1 | AAA,BBB | X.X.X | Red | A |
| 2 | AAA | Y.Y.Y | Green | N/A |
| 3 | CCC | Z.Z.Z | Yellow | A |
| 4 | AAA | V.V.V | Green | A |
| 5 | AAA,CCC | W.W.W | Green | A |
| ⋮ | ⋮ | ⋮ | ⋮ | ⋮ |

CONTENTS DELIVERY SYSTEM AND METHOD USING OBJECT REDIRECTION, AND GSLB SWITCH THEREOF

RELATED APPLICATIONS

The present application is based on and claims priority from U.S. Provisional Application No. 61/088,541, filed Aug. 13, 2008, the disclosure of which is hereby incorporated by reference herein in its entirety.

BACKGROUND OF THE INVENTION

1. Field of the Invention

The present invention relates to a contents delivery system and method, and more particularly, to a contents delivery system and method using object redirection for allowing a web server, which receives a request for an object included in a page from a client, to redirect the request such that a host server of a contents delivery network (CDN) provider transmits the corresponding contents and a global server load balancing (GSLB) switch of the contents delivery system.

2. Description of the Related Art

A web server of a contents provider (CP) generally provides a large number of contents (for example, videos, music, files, etc.) to clients. A large load is generated when the web server provides the whole or some of the contents to a plurality of clients one to one because the plurality of clients exist in a plurality of Internet service providers (ISPs) while the web server is connected to a single ISP.

Accordingly, traffic between ISPs exponentially increases as the number of contents providers and clients increase, and thus transmission delay and/or transmission failure rate due to traffic congestion increase. Web server fail-over may occur in the worst case.

To solve this problem, a contents delivery network (CDN) is introduced. The CDN is a service which previously stores contents converging on a web server of a contents provider located at a great distance from clients, for example, contents with large capacity, such as pictures, banners, videos or audio, or contents frequently requested by clients, in host servers globally deployed at points of presence (PoP) of a plurality of ISPs and redirects the path of the host server closest to a client when the client requests the contents provider to provide contents such that the client accesses the host server through the redirected path to be provided with the contents. Here, the host server may be referred to as a cache server, a replica server or a ghost server.

The CDN is classified into an overlay type and a network type according to system configuration. In the overlay type CDN, a server for a special purpose and a plurality of cache servers manage distribution of contents. The overlay type CDN has an advantage of simple administration because there is no need for a CDN provider to control network lower layer. In the network type CDN, network components such as a router and a switch include codes for confirming a specific application type and forwarding requests of clients according to a predetermined policy.

Recently, most of solutions of CDN providers have adopted mixture of the overlay and network types. An example of mixture of the two types is disclosed in U.S. Pat. No. 6,108,703 (Referred to as '703 patent hereinafter) entitled "Global hosting system", issued to F. Thomson Lieghton et al., and assigned to MIT (Massachusetts Institute of Technology).

According to the '703 patent, a web server of a contents provider provides a page including a uniform resource locator (URL) (referred to as 'modified URL' hereinafter) of an embedded object, which is modified according to a special routine, in response to a request of a client. The web browser of the client loads the embedded object in order to display the page. The '703 patent identifies the modified URL through hierarchical DNS servers called a first level name server and a second level name server and returns the IP address of the optimum host server capable of providing the actual object to the client.

The '703 patent uses so-called DNS-based request routing. General DNS-based request routing has a problem that network latency according to DNS look-up time is aggravated. The '703 patent increases system complexity although it decreases network latency by constructing hierarchical DNS servers.

The above-described routine for generating the modified URL operates in the web server of the contents provider. An illustrative routine disclosed in the '703 patent is as follows.

1. Embedded object URL before modified:
   www.domainname,com/frontpage.jpg
2. Embedded object URL after modified:
   www.yy.zzz.net/aaaa/www.domainame.com/frontpage-.jpg Here, xxx field denotes a serial number, yy field denotes the second level name server, zzz field represents the first level name server and aaaa field represents other information (for example, fingerprint).

The modified URL includes a plurality of fields in addition to fields (yy and zzz) for achieving the DNS-based request routing in a complicated form. Furthermore, the routine for generating the modified URL must be executed and maintained by the web server of the contents provider.

However, when the contents provider replaces the solution of the CDN provider according to the '703 patent by the solution of another CDN provider, it is required to re-modify or change the modified URL applied to all pages according to the routine or recommendation of the solution of the other CDN provider. That is, flexibility in the change of the CDN solution is deteriorated.

Furthermore, URL modification according to the routine of the '703 patent increases the length of an HTML tag and the capacity of a page.

Accordingly, a method for solving the aforementioned problems is required.

SUMMARY OF THE INVENTION

The present invention provides a system and a method for allowing a web server which receives a request for a page and objects included in the page from a client to deliver corresponding contents without having a burden of modifying URLs of embedded objects to decrease system complexity and secure flexibility in changed of a CDN solution.

According to an aspect of the present invention, there is provided a contents delivery system using object redirection, which includes at least one host server receiving and storing an object embedded in a page; a web server storing the page and the object, transmitting the object to the at least one host server such that the at least one host server stores the object, transmitting the page to a client at the request of the client, embedding the URL representing the position of the object stored in the at least one host server in an HTTP 302 redirection message and transmitting the HTTP 302 redirection message including the URL to the client when the client requests the web server to provide the object; and a GSLB switch corresponding to the URL and transmitting the IP address of a specific host server which will transmit the object, selected from the at least one host server, to the client receiving the message through a local DNS server at the client when receiving inquiry of the local DNS server about the IP address of the host server storing the object.

The GSLB switch may select the specific host server which will transmit the object with reference to a host network map including position information of the at least one host server and object information stored in the at least one host server.

The position information of the least one host server may include the IP address of the at least one host server.

The GSLB switch may select the specific host server located in proximity to the client with reference to the IP address of the at least one host server and the IP address of the client.

The GSLB switch may select the specific host server in consideration of at least one of data traffic information of the at least one host server and fail-over information of the at least one host server.

According to another aspect of the present invention, there is provided a contents delivery method using object redirection, which includes a storing step in which at least one host server receives an object embedded in a page from a web server and stores the object; a message transmitting step in which the web server embeds the URL representing the position of the object stored in the host server in an HTTP 302 redirection message and transmits the HTTP 302 redirection message including the URL to a client receiving the page when the client requests the web server to provide the object; and an address transmitting step in which a GSLB switch corresponding to the URL transmits the IP address of a specific host server which will transmit the object, selected from the at least one host server, to the client receiving the message through a local DNS server at the client when receiving inquiry of the local DNS server about the IP address of the host server storing the object.

The GSLB switch may transmit the IP address of the specific host server to the local DNS server in consideration of at least one of data traffic information of the at least one host server, fail-over information of the at least one host server, information on proximity of the client to the at least one host server and object information stored in the at least one host server in the address transmitting step.

The GSLB switch may transmit the IP address of another GSLB switch to the local DNS server and the other GSLB switch may receive inquiry of the local DNS server about the IP address of the specific host server storing the object from the local DNS server and transmit the IP address of the specific host server to the client in the address transmitting step.

The GSLB switch may transmit the IP address of the other GSLB switch among a plurality of GSLB switches to the local DNS server with reference to fail-over information of the plurality of GSLB switches in the address transmitting step.

According to another aspect of the present invention, there is provided a GSLB switch including a transmitting/receiving unit transmitting/receiving data; a host network map database storing a host network map including position information of at least on host server and object information stored in the at least one host server; and a controller receiving the position information of the at least one host server and the object information stored in the at least one host server through the transmitting/receiving unit to update the host network map, selecting a specific host server which will transmit the object from the at least one host server with reference to the host network map and transmitting the IP address of the specific host server to a client through a local DNS server at the client via the transmitting/receiving unit when receiving inquiry of the local DNS server about the IP address of the host server storing the object from the local DNS server through the transmitting/receiving unit.

The position information of the at least one host server may include the IP address of the at least one host server.

The controller may select the specific host server located in proximity to the client with reference to the IP address of the at least one host server and the IP address of the client.

The GSLB switch may further include an information collecting module collecting at least one of data traffic information of the at least one host server and fail-over information of the at least one host server through the transmitting/receiving unit.

The information collecting module may further collect fail-over information of a plurality of GSLB switches.

The information collecting module may collect the information by transmitting/receiving messages to/from the at least one host server or the plurality of GSLB switches at predetermined periods.

The information collecting module may collect the fail-over information when data traffic is relatively small in consideration of data traffic of the at least one host server or the plurality of GSLB switches.

The controller may transmit the IP address of the specific host server with reference to the information collected by the information collecting module when receiving the inquiry of the local DNS server about the IP address.

The controller may transmit the IP address of a GSLB switch other than the GSLB switch among the plurality of GSLB switches with reference to the information collected by the information collecting module when receiving the inquiry of the local DNS server about the IP address.

The information collecting module may store the collected information in the host network map.

BRIEF DESCRIPTION OF THE DRAWINGS

The above and other features and advantages of the present invention will become more apparent by describing in detail exemplary embodiments thereof with reference to the attached drawings in which:

FIG. 3 is host network map information stored in a host network map database illustrated in FIG. 2.

DETAILED DESCRIPTION OF THE INVENTION

Figure 1:
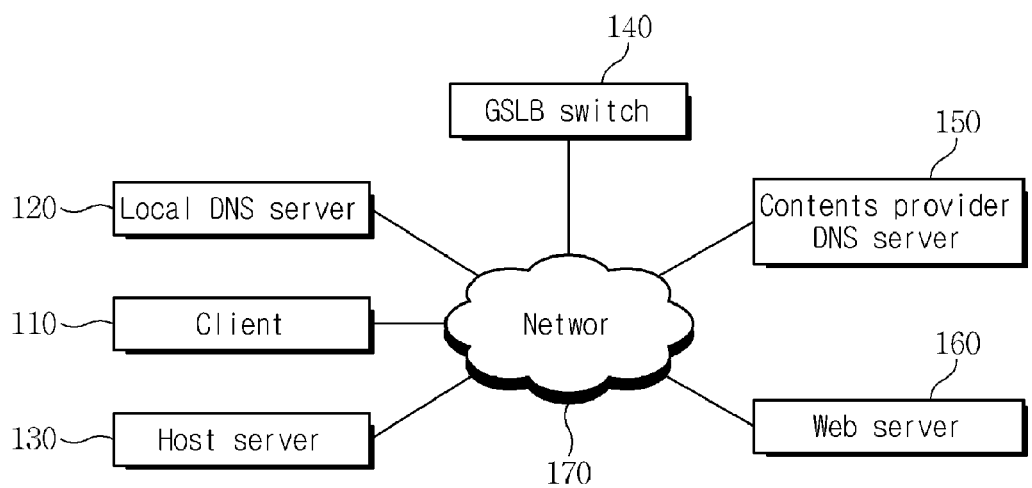
FIG. 1 is a configuration of a contents delivery system using object redirection according to an embodiment of the present invention.

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art. Throughout the drawings, like reference numerals refer to like elements.

FIG. 1 illustrates a configuration of a contents delivery system using object redirection according to an embodiment of the present invention. Referring to FIG. 1, the contents delivery system includes a client 110, a local domain name system (DNS) server 120, a host server 130, a GSLB switch 140, a contents provider DNS server 150, a web server 160 and a network 170.

The client 110 corresponds to equipment such as a computer receiving information from the servers connected through the network 170. For example, the client 110 includes equipment which is currently commercially used or will be developed such as personal computers (PCs), household appliances, mobile communication devices, etc. in the current embodiment of the invention.

The client 110 includes a browser and a resolver. When a uniform resource locator (URL) that requests specific contents is input to the browser of the client 110, the resolver connected to the browser accesses the previously registered local DNS server 120 and resolves a domain name corresponding to the URL into the IP (Internet Protocol) address of the web server 160 providing the contents.

In the current embodiment of the invention, the client 110 request the web server 160 to provide a page by using the IP address of the web server 160, received from the local DNS server 120. When the client 110 parses the page received from the web server 160 and detects a URL representing an embedded object while parsing the page, the client 110 requests the web server to provide the object included in the page through a process similar to the aforementioned page request process.

When the client 110 receives the URL representing the position of the object included in the page from the web server 160 through a hypertext transfer protocol (HTTP) 302 redirection message, the client 110 inquires of the local DNS server 120 about the IP address of a host server that stores the object included in the page by using the URL. The HTTP 302 redirection message is one of response messages according to HTTP for redirecting a request of the client 110 to a URL at a different position.

When the client 110 receives the IP address of the host server 130 storing the object included in the page from the local DNS server 120, the client 110 accesses the host server 130 by using the IP address and receives the object included in the page.

The local DNS server 120 means a domain name server that transforms a domain name into an IP address and converts a symbolic name into a numeral address used by machines. The local DNS server 120 that receives the domain name of the web server 160 from the resolver accesses the contents provider DNS server 150, receives the IP address of the web server 160, which corresponds to the domain name and transmits the IP address to the client 110.

When the client 110 request the local DNS server 120 to provide the IP address of the host server storing the object included in the page, the local DNS server 120 transmits/receives messages to/from the GSLB switch 140 to receive the IP address of the host server 130 storing the object included in the page and transmits the IP address to the client 110.

The host server 130 stores replicas of page-embedded objects stored and administrated by the web server 160 and rapidly provides the replicas when the client 110 requests contents.

The GSLB switch 140 provides an intelligent DNS function, identifies and administrates at least one globally deployed host server 130. For example, the GSLB switch 140 according to the current embodiment of the invention has position information of the at least one host server 130 and information on embedded objects stored in the at least one host server 130. Here, the position information of the at least one host server 130 may include the IP address of the at least one host server 130 and the GSLB switch 140 may determine proximity of the client 110 to the at least one host server 130 by using the IP address of the at least one host server 130.

The GSLB switch 140 may select a specific host server 130 which will transmit the object, requested by the client 110, to the client 110 on the basis of the proximity of the client 110 to the at least one host server 130 and the information on the objects stored the at least one host server 130 and transmit the IP address of the selected host server 130 to the client 110 through the local DNS server 120.

Furthermore, the GSLB switch 140 may select the specific host server 130 which will respond to the request of the client 110 in consideration of data traffic information and fail-over information of the at least one host server 130 and transmit the IP address of the selected host server 130 to the client 110.

Here, the information on the proximity of the client 110 to the host server 130, information on pages and objects stored in the host server 130, and the data traffic information and fail-over information of the host server 130 may be collected at predetermined time such as a predetermined period in consideration of data traffic and load of the GSLB switch 140 or the host server 130 when the pages and objects stored in the host server 130 are updated.

In the current embodiment of the invention, the GSLB switch 140 may collect fail-over information of a plurality of other GSLB switches. For instance, when there is a GSLB switch more suitable to respond to the inquiry of the local DNS server 120 about the IP address of the host server 130 than the GSLB switch 140, the inquiry is re-routed to the more suitable GSLB switch such that the GSLB switch can respond to the inquiry of the local DNS server 120. Here, the routing can be achieved with reference to fail-over information of the GSLB switch 140, other GSLB switches or the host server 130. The fail-over information of the other GSLB switches may be collected at predetermined time such as a predetermined period in consideration of data traffic and load of the GSLB switch 140 and other GSLB switches or the host server 130.

The web server 160 provides web pages and embedded objects included in the web pages provided by a contents provider. In the current embodiment of the invention, the contents provider transmits the pages and embedded objects included in the pages from the web server 160 to the host server 130 and stores the pages and embedded objects in the host server 130. Accordingly, when the client 110 requests the web server 160 to provide an object included in a specific page, the client 110 can rapidly receive a response through the host server 130.

Furthermore, the web server 160 transmits a page to the client 110 when the client 110 requests the web server 160 to provide the page. When the client 110 requests the web server 160 to provide an object included in the page after receiving the page, the web server 160 embeds the URL representing the position of the object in an HTTP 302 redirection message and transmits the HTTP 302 redirection message to the client 110. Then, the client 110 requests the local DNS server 120 to provide the IP address of the specific host server 130 which will transmit the object included in the page by using the URL and accesses the specific host server 130 to receive the object.

The contents provider DNS server 150 is a DNS server of the contents provider. When the local DNS server 120 inquires of the contents provider DNS server 150 about the IP address of the web server 160 storing the page and the object included in the page, the contents provider DNS server 150 returns the IP address to the local DNS server 120 such that the IP address is delivered to the client 110.

The network 170 corresponds to a data communication network for data transmission and information exchange among the client 110, the local DNS server 120, the host server 130, the GSLB switch 140, the contents provider DNS server 150 and the web server 160. The network 170 according to the present invention includes Internet, Intranet, Extranet, and other wired and wireless networks and a combination thereof, which are well-known or will be developed.

The configuration and operation of the GSLB switch 140 according to an embodiment of the present invention will now be explained in more detail with reference to FIG. 2.

Figure 2:
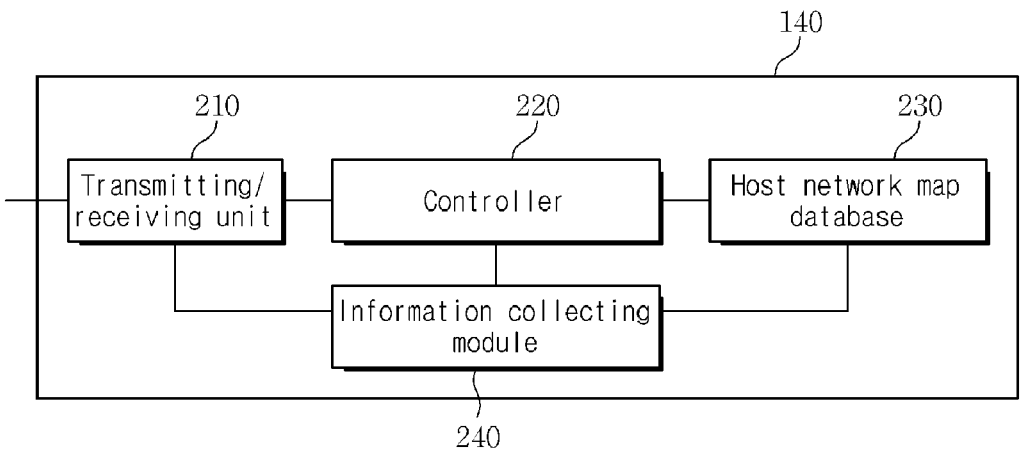
FIG. 2 is a block diagram of a GSLB switch illustrated in FIG. 1.

FIG. 2 is a block diagram of the GSLB switch 140 illustrated in FIG. 1. Referring to FIGS. 1 and 2, the GSLB switch 140 includes a transmitting/receiving unit 210, a controller 220, a host network map database 230 and an information collecting module 240.

The transmitting/receiving unit 210 includes an interface for transmitting/receiving data and messages through the network 170.

The host network map database 230 stores a host network map including the position information of the at least one host server 130 and the information on page embedded objects stored in the at least one host server 130.

The information collecting module 240 collects at least one of the fail-over information of the plurality of other GSLB switches, fail-over information of the host server 130 and data traffic information of the host server 130 through the transmitting/receiving unit 210. For instance, the information collecting module 240 may collect the information at specific periods. Furthermore, the information collecting module 240 may collect the information when data traffic is relatively small in consideration of the data traffic of the other GSLB switches or the host server 130. The information collected by the information collecting module 240 is stored in the host network map such that the controller 230 can refer to the information.

The controller 220 receives the position information of the at least one host server 130 and the object information stored in the at least one host server 130 through the transmitting/receiving unit 210 and updates the host network map. Furthermore, when the controller 220 receives inquiry of the local DNS server 120 about the IP address of the specific host server 130 storing an object included in a page, requested by the client 110, the controller 220 selects the specific host server 130 which will transmit the object from the at least one host server 130 with reference to the host network map stored in the host network map database 230 and transmits the IP address of the selected host server 130 to the client 110 through the transmitting/receiving unit 210 via the local DNS server 120.

In addition, the controller 220 may select the specific host server 130 which will transmit the object to the client 110 with reference to information collected by the information collecting module 240. The information may be collected in real time. Otherwise, the information may be collected by the information collecting module 240 and stored in the host network map or updated and stored in the host network map.

The controller 220 may route the inquiry of the local DNS server 120 about the IP address of the host server 130 to a GSLB switch more suitable for the response to the inquiry with reference to the fail-over information of the other GSLB switches, collected by the information collecting module 240. That is, if the GSLB switch 140 fails or data traffic of the GSLB switch 140 exceeds a critical value, the controller 220 allows another GSLB switch having no fail-over to respond to the request of the client 110, as described hereinafter with respect to FIG. 5.

The information of the host network map stored in the host network map database 230 will now be described in more detail with reference to FIG. 2.

FIG. 3 illustrates information of the host network map 300 stored in the host network map database 230 illustrated in FIG. 2. The host network map 300 is map information referred to by the GSLB switch 140 when the GSLB switch 140 selects the host server 130 which provides the object requested by the client 110.

Referring to FIG. 3, the host network map 300 includes host server information 310, stored object information 320, IP address 330, data traffic information 340 and fail-over information 550 in column.

The host server information 310 corresponds to an identification information field for identifying the host server 130. Although the host server information 310 is represented by numerals in the current embodiment of the invention, it is not limited thereto and any identifier capable of identifying the host server 130 can be included in the technical scope of the present invention.

The stored object information 320 corresponds to a field representing information on page embedded objects received from the web server 160 and stored in the host server 130.

The IP address 330 corresponds to a field representing the IP address of each host server 130. The IP address field 330 may include a plurality of IP addresses of a single host server 130.

The data traffic information 340 corresponds to a field representing data traffic of each host server 130. Although large data traffic is represented as 'Red', slightly large data traffic is represented as 'Yellow' and small data traffic is represented as 'Green' in the current embodiment of the invention, the technical scope of the present invention is not limited thereto.

The fail-over information 350 corresponds to a field representing whether each host server 130 fails over. Specifically, 'A (Available)' represents that the host server 130 normally operates and 'N/A (Non-available)' represents that the host server 130 fails over.

Referring to the host network map 300, the stored page and object information 320 corresponding to host server '1' in the host server information 310 corresponds to 'AAA' and 'BBB', and thus it can be known that host server '1' stores pages or objects 'AAA' and 'BBB'. Furthermore, the IP address of host server '1' is 'X.X.X' and data traffic of host server '1' is 'Red', and thus host server '1' has large data traffic. In addition, the fail-over information 350 corresponding to host server '1' is represented as 'A', and thus host server '1' does not fail over. Host servers '2', '3', '4' and '5' can be understood in the same manner so that detailed explanations thereof are omitted.

If the client 110 requests the GSLB switch 140 to provide the IP address of the host server 130 which will transmit contents 'AAA' through the local DNS server 120, the controller 220 of the GSLB switch 140 recognizes that host servers '1', '2', '4' and '5' store contents 'AAA' from the host network map 300 stored in the host network map database 230.

Here, host server '1' has large data traffic because the data traffic information 340 thereof is represented as 'Red' and host server '2' has fail-over because the fail-over information 350 thereof is represented as 'N/A', and thus host servers '1' and '2' are not suitable to transmit contents 'AAA'. Host servers '4' and '5' have small data traffic because data traffic information 340 thereof is represented as 'Green' and do not have fail-over because the fail-over information 350 thereof is represented as 'A'. Accordingly, the controller 220 of the GSLB switch 140 selects one of host servers '4' and '5' as a host server suitable to transmit contents 'AAA'.

Here, the controller 220 of the GSLB switch 140 may allow one of host servers '4' and '5', which is closer to the client 110 than the other, to transmit the corresponding contents in consideration of proximity of the client 110 to the host servers. For instance, the controller 220 may compare the IP addresses of host servers '4' and '5' to the IP address of the client 110 and select a host server closer to the client 110 than the other.

A contents delivery method according to an embodiment of the present invention will now be explained with reference to FIG. 4 in detail.

Figure 4:
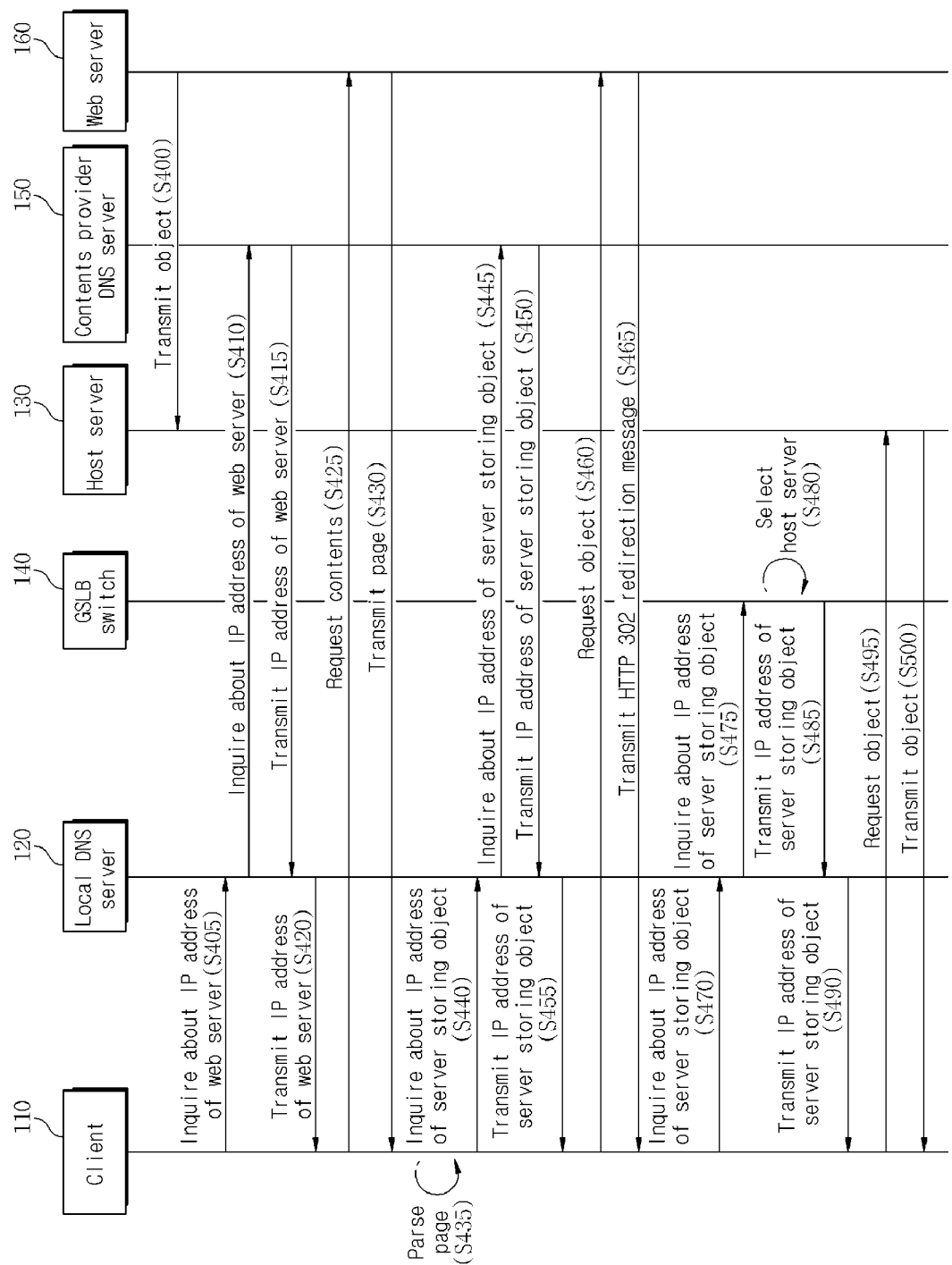
FIGS. 4 and 5 are flowcharts of contents delivery methods according to several embodiments of the present invention.

FIG. 4 is a flowchart showing a contents delivery method using object redirection according to an embodiment of the present invention. Referring to FIG. 4, the host server 130 receives an object included in a page of a contents provider from the web server 160 and stores the object in step S400. Here, contents, that is, the object included in the page, can be transmitted when the host server 130 requests the web server 160 to provide the contents, at specific periods, and when the object included in the page stored in the web server 160 are updated.

When a URL for requesting the web server 160 to provide the contents is input to the browser of the client 110, the resolver of the client 110 inquires of the local DNS server 120 about the IP address of the web server 160 storing the page and the object included in the page in step S405.

The local DNS server 120 receives the inquiry of the client 110 about the IP address of the web server 160 in step S405 and inquires of the contents provider DNS server 150 corresponding to the DNS server of the contents provider about the IP address of the web server 160 storing the page and the object in step S410.

The contents provider DNS server 150 receives the inquiry of the local DNS server 120 in step S410 and transmits the IP address of the web server 160 to the local DNS server 120 in step S415. The local DNS server 120 receives the IP address of the web server 160 and transmits the received IP address to the client 110 in step S420.

The client 110 receives the IP address of the web server 160 in step S420 and requests the web server 160 to provide contents including the page and the object by using the IP address of the web server 160 in step S425. The web server 160 receiving the request of the client 110 in step S425 transmits the page to the client 110 in step S430.

The client 110 receives the page in step S430 and parses the page in step S435. When the client detects the URL of the object included in the page while parsing the page in step S435, the client 110 inquire of the local DNS server 120 about the IP address of the server storing the object included in the page by using the URL in step S440.

The local DNS server 120 receives the inquiry of the client 110 in step S440 and inquires of the contents provider DNS server 150 about the IP address of the server storing the object in step S445.

The contents provider DNS server 150 receiving the inquiry of the local DNS server 120 in step S445 transmits the IP address of the web server 160 storing the object to the local DNS server 120 in step S450. The local DNS server 120 transmits the IP address received in step S450 to the client 110 in step S455.

The client 110 receives the IP address of the web server 160 in step S455 and requests the web server 160 to provide the object included in the page by using the IP address of the web server 160 in step S460.

The web server 160 receives the request of the client 110 in step S460, embeds the URL representing the position of the object stored in the CDN provider in an HTTP 302 redirection message and transmits the HTTP 302 redirection message including the URL to the client 110 in step S465.

The client 110 receives the HTTP 302 redirection message including the URL representing the position of the object in step S465 and inquires of the local DNS server 120 about the IP address of the host server 130 storing the object by using the URL in step S470. The local DNS server 120 receives the inquiry of the client 110 in step S470 and inquires of the GSLB switch 140 corresponding to the URL about the IP address of the host server 130 which will transmit the object included in the page in step S475.

The GSLB switch 140 receives the inquiry of the local DNS server 120 in step S475 and selects the specific host serve 130 which will transmit the object to the client 110 from the at least one host server in step S480. For example, the GSLB switch 140 can select the specific host server 130 in consideration of data traffic information of the at least one host server, fail-over information of the at least one host server, information on proximity of the client to the at least one host server, and object information stored in the at least one host server.

The GSLB switch 140 transmits the IP address of the selected host server 130 to the local DNS server 120 in step S485. The local DNS server 120 transmits the IP address of the host server 130 to the client 110 in step S490.

The client 110 receives the IP address of the host server 130 in step S490, requests the host server 130 to provide the object in step S495 and receives the object transmitted from the host server 130 in step S500.

Figure 5:
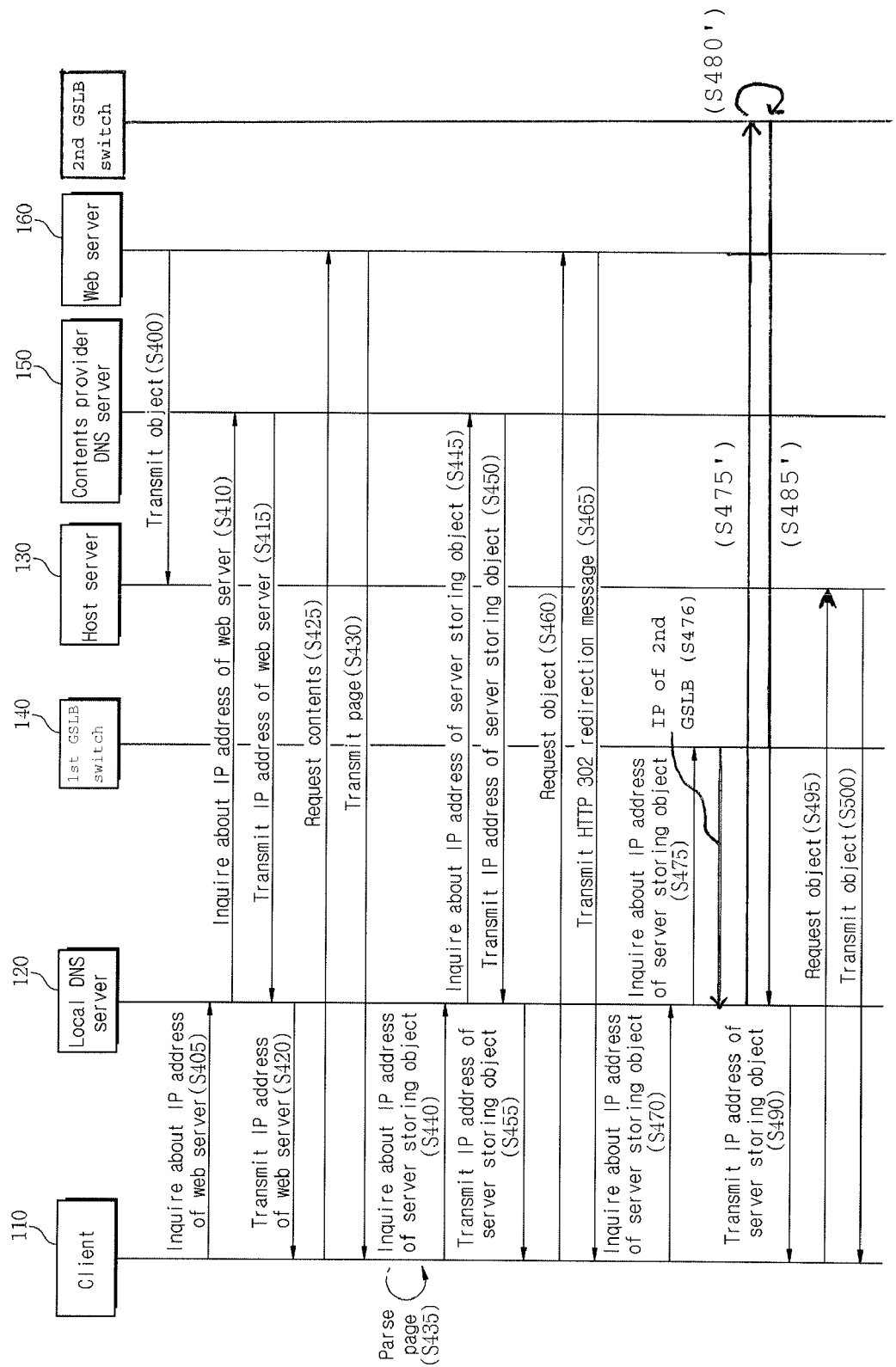

FIG. 5 is a flowchart showing a contents delivery method using object redirection according to another embodiment of the present invention. The method of FIG. 5 is similar to the method of FIG. 4, except for the following steps.

At step S476, in response to an inquiry (step S475) from the local DNS server 120 about the IP address of the host server 130 which will transmit the object, the GSLB switch 140 (hereinafter referred to as the first GSLB switch) realizes that its data traffic exceeds a critical value and transmits the IP address of another GSLB switch 140 (hereinafter referred to as the second GSLB switch) to the local DNS server 120.

At step S475', the local DNS server 120 inquires the second GSLB switch 140 about the IP address of the host server 130 which will transmit the object, in a manner similar to step S475 in the method of FIG. 4.

At step S480', the second GSLB switch 140 selects the specific host server 130 which will transmit the object to the client 110, in a manner similar to step S480 in the method of FIG. 4.

At step S485', the second GSLB switch 140 transmits the IP address of the selected host server 130 to the local DNS server 120, in a manner similar to step S485 in the method of FIG. 4.

According to the present invention, the GSLB switch can select a specific host server to provide an object included in a page to the client. Accordingly, load of the web server is reduced and there is no need to modify URLs of embedded objects when a CDN solution is changed. Furthermore, the client can receive the page embedded object more rapidly.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A contents delivery system using object redirection, said system comprising:
   a plurality of global server load balancing (GSLB) switches including at least first and second GSLB switches;
   at least one host server for receiving and storing an object embedded in a page; and
   a web server for
   storing the page and the object,
   transmitting the object to the at least one host server such that the at least one host server stores the object,
   transmitting the page, without the object, to a client at a request of the client, and
   when the client requests the web server to provide the object embedding a Uniform Resource Locator (URL) corresponding to the first GSLB switch as the position of the object stored in the at least one host server in a Hypertext Transfer Protocol (HTTP) redirection message,
   and transmitting the HTTP redirection message including the URL to the client;
   wherein
   said first GSLB switch is arranged for transmitting the Internet Protocol (IP) address of the second GSLB switch to a local Domain Name System (DNS) server of the client when said first GSLB switch receives an inquiry from the local DNS server about the IP address of a host server storing the object and when data traffic of said first GSLB switch exceeds a critical value; and
   said second GSLB switch is arranged for transmitting, to the client who has received the redirection message via the DNS server, the IP address of a specific host server which will transmit the object.

2. The contents delivery system of claim 1, wherein said second GSLB switch selects the specific host server which will transmit the object with reference to a host network map including position information of the at least one host server and object information stored in the at least one host server.

3. The contents delivery system of claim 2, wherein the position information of the least one host server includes the IP address of the at least one host server.

4. The contents delivery system of claim 3, wherein said second GSLB switch selects the specific host server located in proximity to the client with reference to the IP address of the at least one host server and the IP address of the client.

5. The contents delivery system of claim 2, wherein said second GSLB switch selects the specific host server in consideration of at least one of data traffic information of the at least one host server and fail-over information of the at least one host server.

6. A contents delivery method using object redirection, comprising:
   a storing step in which at least one host server receives an object embedded in a page from a web server and stores the object;
   a message transmitting step in which the web server embeds a Uniform Resource Locator (URL) corresponding to a first global server load balancing (GSLB) switch as the position of the object stored in the host server in a Hypertext Transfer Protocol (HTTP) redirection message and transmits the HTTP redirection message including the URL to a client receiving the page, without the object, when the client requests the web server to provide the object; and
   an address transmitting step in which the first GSLB switch transmits the IP address of a second GSLB switch to a local Domain Name System (DNS) server of the client when the first GSLB switch receives an inquiry about the IP address of the specific host server storing the object from the local DNS server and when data traffic of said first GSLB switch exceeds a critical value, and
   the second GSLB switch transmits the IP address of the specific host server, which will transmit the object, to the client.

7. The contents delivery method of claim 6, wherein, in the address transmitting step, the second GSLB switch transmits the IP address of the specific host server to the local DNS server in consideration of at least one of
   data traffic information of the at least one host server,
   fail-over information of the at least one host server,
   information on proximity of the client to the at least one host server, and
   object information stored in the at least one host server.

8. The contents delivery method of claim 6, wherein the first GSLB switch transmits the IP address of the second GSLB switch among a plurality of GSLB switches to the local DNS server with reference to fail-over information of the plurality of GSLB switches in the address transmitting step.

* * * * *